Patented Aug. 7, 1945

2,381,408

UNITED STATES PATENT OFFICE 2,381,408

NITRO AMINES AND PROCESS FOR PREPARING SAME

Murray Senkus, Terre Haute, Ind., assignor to Commercial Solvents Corporation, Terre Haute, Ind., a corporation of Maryland No Drawing. Application April 12, 1943, Serial No. 482,756

10 Claims. (Cl. 260—570)

My invention relates to new nitro amines, and to a novel process for their preparation. Specifically these new compounds may be represented by the following structural formula:

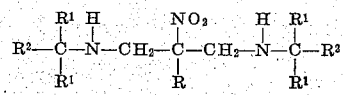

in which R may be aryl, alkyl, or halogen, $R^1$ may be either hydrogen, hydroxymethyl, or alkyl, and $R^2$ represents aryl, hydrogen, aralkyl, alkyl, tetrahydrofuryl, or hydroxymethyl.

As examples of nitro amines which are included by the above generic formula, there may be mentioned 5-nitro-2,5,8-trimethyl-3,7-diazanonane, 4-nitro-1,4,7-triphenyl-2,6-diazaheptane, 4-nitro-4-ethyl-1,7-bistetrahydrofurfuryl-2,6 - diazaheptane, 4-nitro-4-chloro-1,7-diphenyl-2,6-diazaheptane, 5-nitro-2,2,5,8,8-pentamethyl-3,7-diaza-1,9-nonanediol, 4-nitro-4-ethyl-1,7-bis(tris(hydroxymethyl))-2,6-diazaheptane, 4-nitro-4-methyl-1,7-bis(bis(hydroxymethyl))-2,6 - diazaheptane, and the like.

Prior to the present invention, investigators in this field found that 1-nitroalkanes could be brought into reaction with the condensation product of a secondary amine and formaldehyde, i. e., an N-(hydroxymethyl)dialkylamine. While making this observation, these investigators also attempted to make 1-nitroalkanes react with the condensation products of a primary amine and formaldehyde, i. e., an N-(hydroxymethyl)alkylamine, but were unsuccessful, and finally came to the conclusion that such a reaction could not be made to proceed under any normal experimental conditions.

Contrary to previous observations, however, I have found that nitro amines of the type described can be readily synthesized in good yields by reacting the desired 1-nitroalkane with the reaction product of formaldehyde and an alkylamine, hereinafter designated as an N-(hydroxymethyl)alkylamine, said 1-nitroalkane being preferably reacted with said N-(hydroxymethyl)alkylamine in a ratio of one mole of nitroalkane to two moles of the N-(hydroxymethyl)alkylamine. A solvent such as water, methanol, or ethanol may be utilized if desired, but in general it will be found that a homogeneous solution can be obtained by agitating the mixture of the N-(hydroxymethyl)alkylamine and nitroalkane. Temperatures ranging from about 20 to 75° C. may in general be employed. In the majority of instances, however, it will be found desirable to effect such reaction at temperatures of from about 25 to 65° C. The nitro amine produced in this manner may readily be further purified by fractional distillation under reduced pressure if a liquid, and if it is a solid, purification may be effected by recrystallization from a suitable solvent, such as, for example, petroleum ether or aqueous acetone.

The 1-nitroalkanes, or primary nitrohydrocarbons, suitable for use in the preparation of these new nitro amines, are represented by the general formula:

$$R\text{---}CH_2\text{---}NO_2$$

in which R is either alkyl, aryl, or halogen. Examples of such nitrohydrocarbons, are phenylnitromethane, nitroethane, 1-nitropropane, 1-nitrobutane, the chloro- and bromonitromethanes, and the like.

Primary amines contemplated by my invention are represented by the following formula:

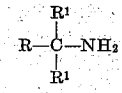

wherein R is either hydrogen, aryl, aralkyl, alkyl, tetrahydrofuryl or hydroxymethyl, and $R^1$ may be hydrogen, hydroxymethyl, or alkyl.

Specific primary amines suitable for use in my process, and which are included by the above generic formula are: benzylamine, phenylethylamine, tetrahydrofurfurylamine, 2 - amino - 2-methyl-1-propanol, 2-amino-2-methyl-1-butanol, methylamine, isopropylamine, butylamine, isobutylamine, 2-amino-2-methyl-1,3-propanediol, 2-amino-1,3-propanediol, tris(hydroxymethyl)-aminomethane, and the like.

The examples which follow are illustrative of the various types of nitro amines that come within the scope of my invention. They are likewise illustrative of the procedures whereby these new chemical compounds may be synthesized. However, it is to be specifically understood that such examples in no way limit the scope of my invention with respect to either the product or process demonstrated therein, since I have found that the reaction involved is very general in nature and will occur under the conditions set forth when reacting substantially any primary amine of the class described, with a nitrohydrocarbon of the various types enumerated above.

Example I

One hundred eighteen parts of isopropylamine was placed in a suitable reaction vessel, after which was added thereto 150 parts of a 35 per cent aqueous formaldehyde solution. The formaldehyde was added slowly with thorough agitation and during the addition period the temperature of the reaction mixture was maintained slightly below 25° C. by means of external cooling. Seventy-five parts of nitroethane was next added slowly with agitation. When all of the nitroethane had been added, the resulting mixture was allowed to stand until the reaction appeared to be complete. The crude 5-nitro-2,5,8-trimethyl-3,7-diazanonane, thus produced, was salted out from the reaction mixture by dissolving therein 20 parts of sodium sulfate. The nonaqueous layer, which contained the crude product, was next separated from the water layer and treated with 5 parts of anhydrous sodium sulfate in order to remove entrained moisture resulting from the separation step. The dried product after filtration was then distilled and 161 parts of 5-nitro-2,5,8-trimethyl-3,7-diazanonane, boiling at 98–100° C. (3 mm.) was collected, corresponding to a 71 per cent conversion of the theoretical amount.

Analysis.—Calculated for $C_{10}H_{23}N_3O_2$: N, 19.44. Found: N, 19.31. $d_{20}^{20}$: 0.9671. $n_D^{20}$: 1.4513.

*Example II*

Ninety-five parts of chloronitromethane was added to 274 parts of N-(hydroxymethyl)benzylamine, which had in turn been prepared from equimolecular proportions of formaldehyde and benzylamine by slowly adding formaldehyde in the form of a 35 per cent solution to the amine, at a temperature of about 24° C. During the addition of chloronitromethane, the reaction mixture was vigorously stirred and the temperature maintained at about 50° C. After approximately one-half hour, the temperature of the mixture was increased to about 65° C., at which value it was allowed to remain for another one-half hour. On cooling to room temperature, the crude product solidified and after three recrystallizations from petroleum ether, amounted to 68 parts. The crude 4-nitro-4-chloro-1,7-diphenyl-2,6-diazaheptane was a light brown crystalline material melting at 74.9° C.

Analysis.—Calculated for $C_{17}H_{20}N_3ClO_2$: Cl, 10.64. Found: Cl, 10.75.

*Example III*

One hundred and eighty parts of 2-amino-2-methyl-1-propanol was introduced into a suitable reaction vessel, after which was added thereto 60 parts of a 35 per cent aqueous formaldehyde solution. The formaldehyde was added slowly with thorough agitation, and during the addition, the temperature of the reaction mixture was maintained slightly below 25° C. by means of external cooling. Eighty parts of nitroethane was next added slowly with agitation. When all of the nitroethane had thus been added, the resulting mixture was allowed to stand until the reaction appeared to be complete. The crude 5-nitro-2,2,5,8,8-pentamethyl-3,7-diaza-1,9-nonanediol thus produced was separated from the mother liquor by means of a centrifuge and amounted to approximately 75 parts. On recrystallization from aqueous acetone, substantially pure 5-nitro-2,2,5,8,8-pentamethyl-3,7-diaza-1,9-nonanediol was obtained in the form of white crystals melting sharply at 125.1° C.

Analysis.—Calculated for $C_{12}H_{27}NO_4$: N, 14.60. Found: N, 14.98.

The nitro amines of the type discussed above are in general either colorless syrupy liquids or white crystalline solids, and are soluble in methanol and benzene, but substantially insoluble in water.

The nitro amines of my invention exhibit utility as active ingredients in various types of insect sprays. These new compositions are likewise useful for numerous other varied and diversified purposes, including their use as intermediates for the preparation of valuable organic compounds. Other uses of these new materials will readily occur to those skilled in the art.

What I claim is:

1. Nitro amines having the formula:

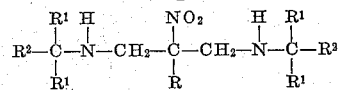

in which R is a member selected from the group consisting of halogen, aryl, and alkyl; $R^1$ is a member selected from the group consisting of hydrogen, hydroxymethyl and alkyl; and $R^2$ is a member selected from the group consisting of aryl, hydrogen, aralkyl, alkyl, tetrahydrofuryl, and hydroxymethyl.

2. 4-nitro-4-chloro-1,7-diphenyl-2,6-diazaheptane.

3. 5-nitro-2,2,5,8,8-pentamethyl-3,7-diaza-1,9-nonanediol.

4. 5-nitro-2,5,8-trimethyl-3,7-diazanonane.

5. A process for the preparation of nitro amines of the class described, which comprises mixing an amine having the formula:

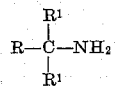

wherein R represents a member of the group selected from aryl, hydrogen, aralkyl, alkyl, tetrahydrofuryl, and hydroxymethyl; and $R^1$ is a member of the group consisting of hydrogen, hydroxymethyl and alkyl; with formaldehyde to form the corresponding N-(hydroxymethyl)-amine, thereafter mixing said N-hydroxymethyl)amine with a primary nitrohydrocarbon in a ratio of two moles of N-hydroxymethyl)amine to one of primary nitrohydrocarbon, at a temperature of between about 25–75° C., and allowing the mixture to stand until the reaction between said primary nitrohydrocarbon and N-(hydroxymethyl)amine is complete.

6. A process for the preparation of nitro amines of the class described, which comprises mixing an amine having the formula:

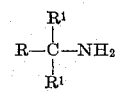

wherein R represents a member selected from the group aryl, hydrogen, aralkyl, alkyl, tetrahydrofuryl, and hydroxymethyl; and $R^1$ a member of the group consisting of hydrogen, hydroxymethyl and alkyl; with formaldehyde to produce the corresponding N-(hydroxymethyl)amine, thereafter mixing the resulting product with a primary nitrohydrocarbon at a temperature between about 25° C. and 75° C. and allowing the mixture to stand until the reaction between said primary nitrohydrocarbon and N-(hydroxymethyl)amine is complete.

7. A process for the preparation of nitro amines of the class described, which comprises mixing an amine having the formula:

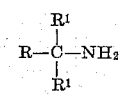

wherein R represents a member of the group selected from aralkyl, aryl, hydrogen, alkyl, tetrahydrofuryl, and hydroxymethyl; and $R^1$ is a member of the group consisting of hydrogen, hydroxymethyl and alkyl; with formaldehyde to produce the corresponding N-(hydroxymethyl)amine, thereafter mixing the resulting product with a primary nitrohydrocarbon at a temperature of from about 25 to 75° C. in the proportion of one mole of the primary nitrohydrocarbon to two moles of formaldehyde and two moles of primary amine, and allowing the mixture to stand until the reaction between said primary nitrohydrocarbon and N-(hydroxymethyl)amine is complete.

8. A process for the preparation of 5-nitro-2,5,8-trimethyl-3,7-diazanonane, which comprises mixing isopropylamine with formaldehyde to produce N-(hydroxymethyl)isopropylamine, thereafter mixing the resulting N-(hydroxymethyl)isopropylamine with nitroethane at a temperature between 25° C. and 75° C., and allowing the mixture to stand until the reaction between said nitroethane and N-(hydroxymethyl)isopropylamine is complete.

9. A process for the preparation of 4-nitro-4-chloro-1,7-diphenyl-2,6-diazaheptane, which comprises mixing benzylamine with formaldehyde to produce N-(hydroxymethyl)benzylamine, and thereafter mixing the resulting N-(hydroxymethyl)benzylamine with chloronitromethane at a temperature between 25° C. and 75° C., and allowing the mixture to stand until the reaction between said chloronitromethane and N-(hydroxymethyl)benzylamine is complete.

10. A process for the preparation of 5-nitro-2,2,5,8,8-pentamethyl-3,7-diaza-1,9-nonanediol, which comprises mixing 2-amino-2-methyl-1-propanol with formaldehyde to produce the corresponding hydroxymethyl-N-(1-hydroxymethylethyl)amine, thereafter mixing the resulting product with nitroethane at a temperature between 25° C. and 75° C., and allowing the mixture to stand until the reaction between said nitroethane and hydroxymethyl-N-(1-hydroxymethylethyl)amine is complete.

MURRAY SENKUS.